United States Patent
Yajima et al.

(10) Patent No.: US 9,643,317 B2
(45) Date of Patent: May 9, 2017

(54) ROBOT SYSTEM CONTROLLING METHOD, PROGRAM, RECORDING MEDIUM, ROBOT SYSTEM, AND DIAGNOSIS APPARATUS

(71) Applicant: CANON KABUSHIKI KAISHA, Tokyo (JP)

(72) Inventors: Akira Yajima, Saitama (JP); Takayuki Ogawara, Yokohama (JP); Hidetada Asano, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/712,759

(22) Filed: May 14, 2015

(65) Prior Publication Data

US 2015/0328774 A1    Nov. 19, 2015

(30) Foreign Application Priority Data

May 16, 2014    (JP) .................................. 2014-102450

(51) Int. Cl.
| | | |
|---|---|---|
| *G06F 19/00* | (2011.01) | |
| *G05B 19/00* | (2006.01) | |
| *G05B 15/00* | (2006.01) | |
| *B25J 9/16* | (2006.01) | |
| *B25J 9/02* | (2006.01) | |

(52) U.S. Cl.
CPC ............... *B25J 9/1674* (2013.01); *B25J 9/02* (2013.01); *G05B 2219/37214* (2013.01); *G05B 2219/39412* (2013.01); *Y10S 901/02* (2013.01)

(58) Field of Classification Search
USPC ............................................ 700/1, 245–264
See application file for complete search history.

(56) References Cited

U.S. PATENT DOCUMENTS

| | | | | |
|---|---|---|---|---|
| 5,404,290 A | * | 4/1995 | Tsuchihashi | B25J 9/1674 700/264 |
| 5,954,610 A | * | 9/1999 | Kamimura | B23F 5/02 409/51 |
| 6,684,128 B1 | * | 1/2004 | Tounai | B25J 9/102 318/568.14 |
| 2007/0288124 A1 | * | 12/2007 | Nagata | B25J 9/1694 700/258 |

(Continued)

FOREIGN PATENT DOCUMENTS

JP          H11202914 A          7/1999

*Primary Examiner* — Bhavesh V Amin
(74) *Attorney, Agent, or Firm* — Canon U.S.A., Inc. IP Division

(57) ABSTRACT

A method of controlling a robot system including an articulated robot and a control device is provided. The articulated robot includes links connected by joints, motors configured to drive the joints respectively, and detection devices configured to detect rotation amounts of the joints respectively. The control device controls the motors. The method includes the steps of, by the control device, recording movement information of the joints based on outputs of the detection devices; when detecting an abnormality in the operation of the articulated robot, determining presence or absence of a failure in the articulated robot based on the movement information recorded in at least a period from before detection of the abnormality until detection of the abnormality; and specifying a failure portion of the articulated robot if it is determined that there is a failure in the articulated robot in the step of determining.

15 Claims, 9 Drawing Sheets

(56) References Cited

U.S. PATENT DOCUMENTS

| | | | | |
|---|---|---|---|---|
| 2008/0048090 A1* | 2/2008 | Hirooka | ............... | B25J 9/103 |
| | | | | 248/664 |
| 2009/0179766 A1* | 7/2009 | Kashio | ............... | B25J 9/1674 |
| | | | | 340/686.1 |
| 2011/0288667 A1* | 11/2011 | Noda | ............... | B25J 9/1661 |
| | | | | 700/98 |
| 2012/0330613 A1* | 12/2012 | Sillman | ............ | G06F 19/3412 |
| | | | | 702/184 |
| 2015/0328774 A1* | 11/2015 | Yajima | ............... | B25J 9/1674 |
| | | | | 700/261 |

* cited by examiner

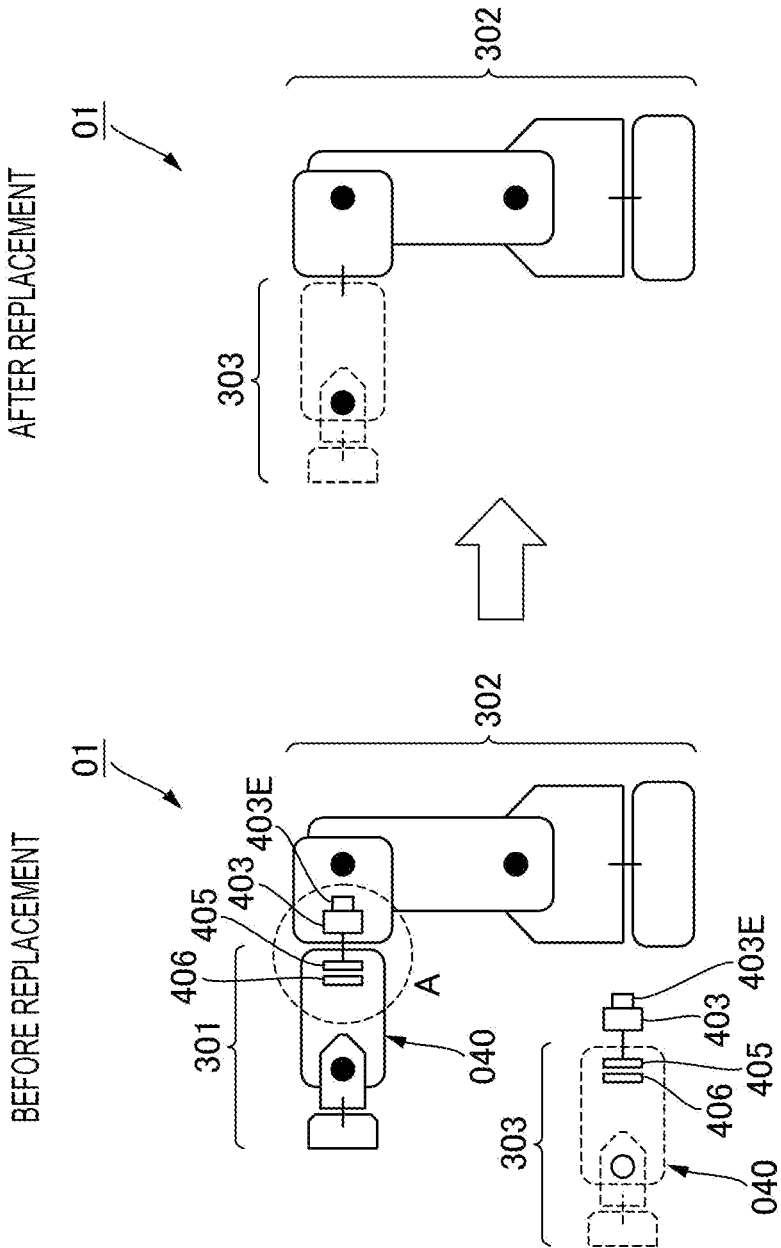
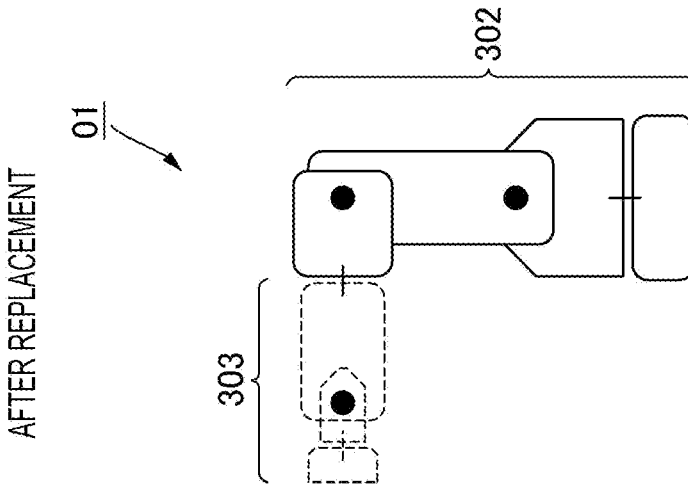
FIG. 3A BEFORE REPLACEMENT
FIG. 3B AFTER REPLACEMENT

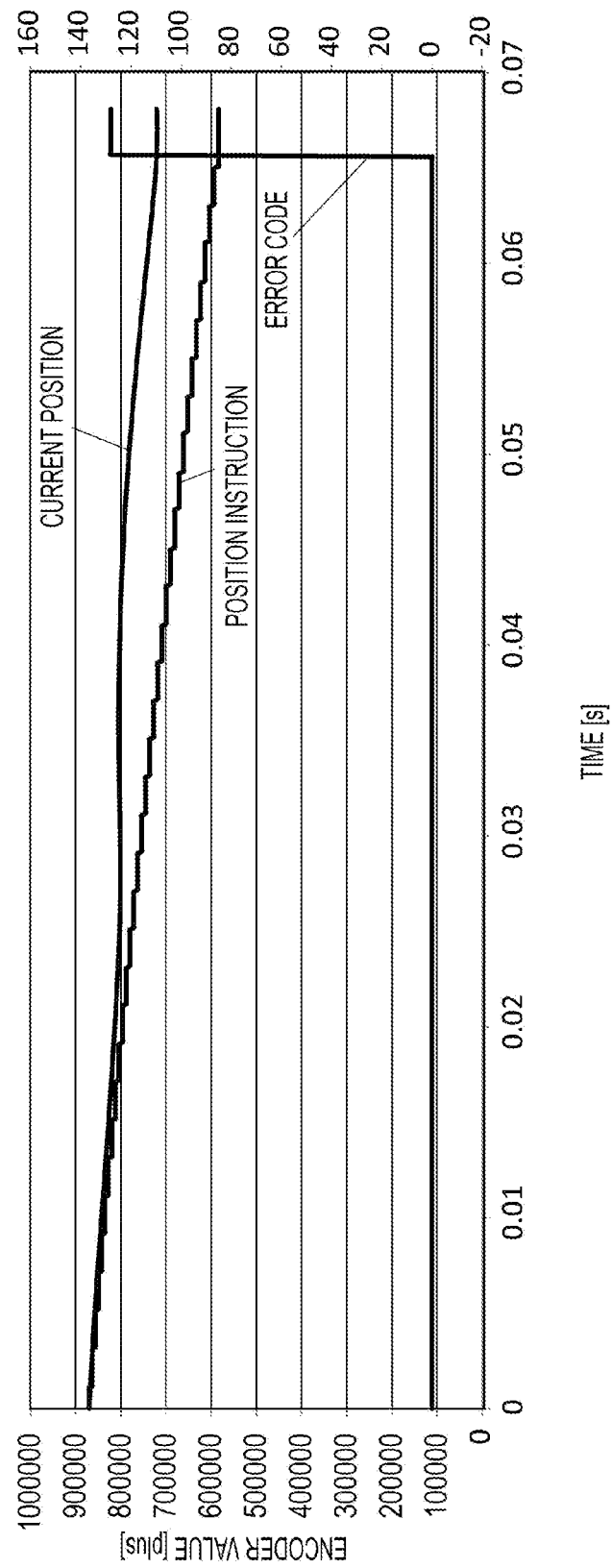

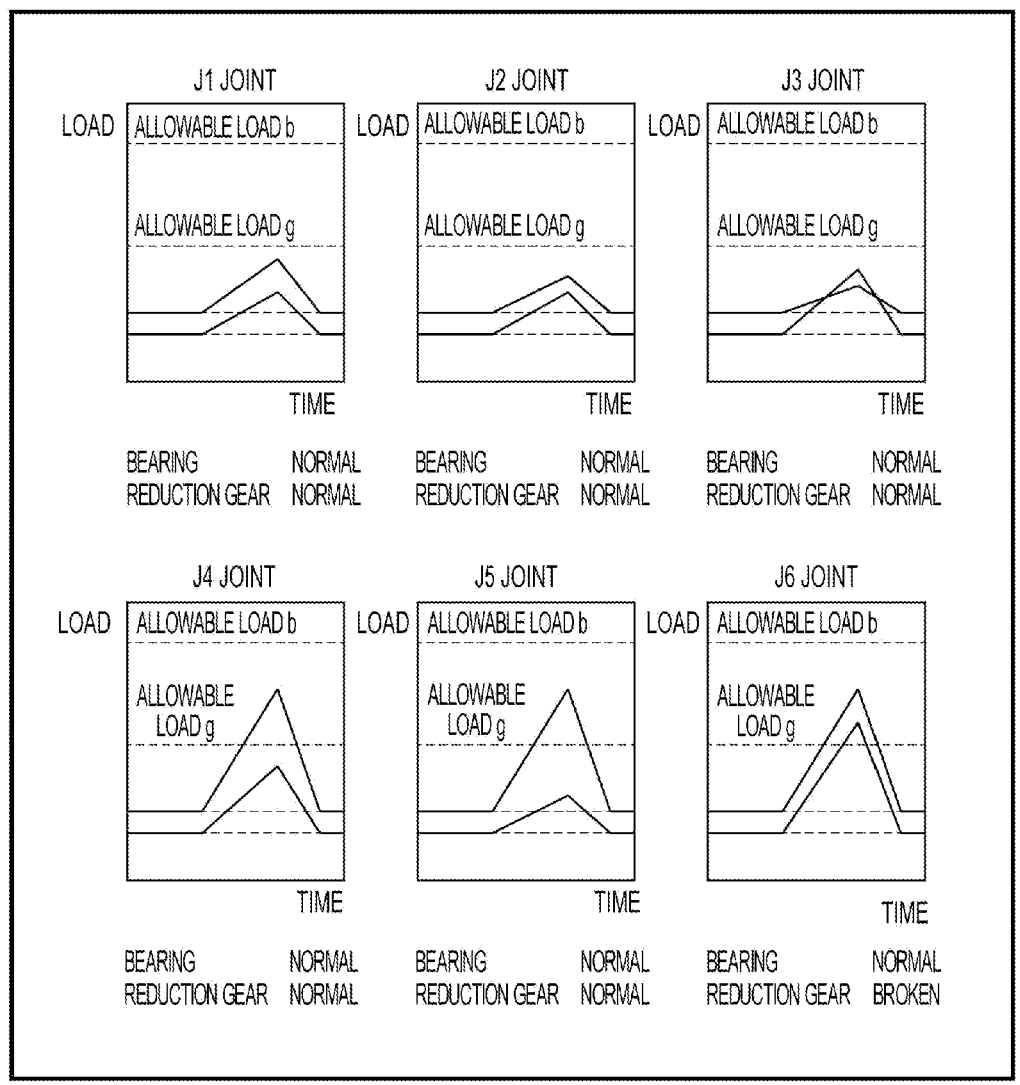

ROBOT SYSTEM CONTROLLING METHOD, PROGRAM, RECORDING MEDIUM, ROBOT SYSTEM, AND DIAGNOSIS APPARATUS

BACKGROUND OF THE INVENTION

Field of the Invention

The present invention relates to a method of controlling an articulated robot including a plurality of motors which drive joints connecting links respectively, and a plurality of detection devices which detect rotation amounts of the joints connecting the links respectively.

Description of the Related Art

An articulated robot, in which both ends of respective links are connected by rotary joints whereby the links are able to perform a bending movement, has been widely used. In the articulated robot, as some of the links have torsional joints which rotate in a torsional direction within a cross-section vertical to a longitudinal direction of the link, the articulated robot is able to perform complicated movement such as six-axis motion or seven-axis motion similar to that of a human arm.

An articulated robot may interfere with another object in any situations including test operation, teaching, and actual operation. When an articulated robot interferes with another object, there is a possibility that an overload is caused in a particular joint so that an origin is shifted, or that a damage is caused in a part such as a reduction gear, a bearing, or the like constituting the joint. If an articulated robot is operated in a state where an origin is shifted in a joint or a part of a joint is damaged, a work may be dropped due to deterioration in the operation accuracy, power consumption may increase, or another articulated robot may be interfered. As such, during operation of the articulated robot, it is required to early find an abnormality in operation in a plurality of joints and to take necessary measures such as part replacement, readjustment, and the like.

In a robot system disclosed in Japanese Patent Application Laid-Open No. 11-202914, a control device takes in load information (electric current) of a motor provided for each of the joints of an articulated robot, and an output of an encoder provided for each of the motors, and computes a current load state of each joint in real time. Then, when a load exceeding an allowable range is computed for any of the joints, the control device terminates the articulated robot and gives notification of the joint in which the load exceeding the allowable range is caused.

In the robot system of Japanese Patent Application Laid-Open No. 11-202914, it is impossible to accurately determine a load state of each of the joints of the articulated robot. For example, when an arm of the articulated robot interferes with another object, even though the electric current variations in the motors and the output variations of the encoders in two joints are the same, the maximum loads caused in the two joints differ largely. As a large difference is caused between the maximum loads placed on the two joints due to interference according to the rotational directions and the load states of the two joints before the interference, broken conditions of the parts cannot be determined accurately.

SUMMARY OF THE INVENTION

Embodiments of the present invention provide a robot system controlling method capable of estimating a load state of each joint accurately and determining a possibility of damage in each joint with less error, when an abnormality such as an interference with another object occurs in an articulated robot.

According to an aspect of the invention, there is provided a robot system controlling method, the robot system including an articulated robot and a control device, the articulated robot including a plurality of links connected by joints; a plurality of motors configured to drive the respective joints respectively; and a plurality of detection devices configured to detect rotation amounts of the respective joints respectively, the control device controlling the motors, the method including:

a recording step of recording movement information of each of the joints based on an output of each of the detection devices, by the control device;

a step of determining presence or absence of a failure in the articulated robot, when detecting an abnormality in an operation of the articulated robot, by the control device, based on the movement information recorded in at least a period from before detection of the abnormality until detection of the abnormality; and a specifying step of specifying a failure portion of the articulated robot if it is determined that there is a failure in the articulated robot in the step of determining.

According to another aspect of the invention, there is provided a recording medium storing a program for causing a computer to perform the robot system controlling method according to the aspect.

According to another aspect of the invention, there is provided a robot system controlling method, the robot system including an articulated robot and a control device, the articulated robot including a plurality of links connected by joints; a plurality of motors configured to drive the respective joints respectively; and a plurality of detection devices configured to detect rotation amounts of the respective joints respectively, the control device controlling the motors, the method including:

a recording step of recording load information of each of the joints based on an output of each of the motors and movement information of each of the joints based on an output of each of the detection devices, by the control device;

a step of determining presence or absence of a failure in the articulated robot, when detecting an abnormality in an operation of the articulated robot, by the control device, based on the load information and the movement information recorded in at least a period from before detection of the abnormality until detection of the abnormality; and a specifying step of specifying a failure portion of the articulated robot if it is determined that there is a failure in the articulated robot in the step of determining.

According to another aspect of the invention, there is provided a robot system including an articulated robot and a control device, wherein the articulated robot includes:
a plurality of links connected by joints;
a plurality of motors configured to drive the respective joints respectively; and
a plurality of detection devices configured to detect rotation amounts of the respective joints respectively, and
the control device is configured to record load information of each of the joints based on an output of each of the motors and movement information of each of the joints based on an output of each of the detection devices, and when detecting an abnormality in an operation of the articulated robot based on at least one of the load information and the movement information, determine presence or absence of a failure in the articulated robot based on the load information and the movement information recorded in at least a period from before detection of the abnormality until detection of the abnormality, and if determining that there is a failure in the articulated robot, specifies a failure portion of the articulated robot.

According to another aspect of the invention, there is provided a diagnosis apparatus connected to a robot system including an articulated robot and a control device, the articulated robot including a plurality of links connected by joints; a plurality of motors configured to drive the respective joints respectively; and a plurality of detection devices configured to detect rotation amounts of the respective joints respectively, the control device configured to detect an abnormality in an operation of the articulated robot and stop the articulated robot, wherein the diagnosis apparatus is configured to record load information and movement information which are input continuously from the robot system during the operation of the articulated robot, and when detecting an abnormality in the operation of the articulated robot, determine presence or absence of a failure in the articulated robot based on the movement information recorded in at least a period from before detection of the abnormality until detection of the abnormality, and if determining that there is a failure in the articulated robot, specify a failure portion of the articulated robot.

Further features of the present invention will become apparent from the following description of exemplary embodiments (with reference to the attached drawings).

BRIEF DESCRIPTION OF THE DRAWINGS

FIGS. 3A and 3B are diagrams illustrating replacement of a spare link unit.

FIGS. 6A and 6B are diagrams illustrating encoder information when a robot interferes with another object.

FIG. 7 is a diagram illustrating motor output information when a robot interferes with another object.

DESCRIPTION OF THE EMBODIMENTS

Hereinafter, embodiments of the present invention will be described in detail with reference to the drawings.

First Embodiment

Figure 1:
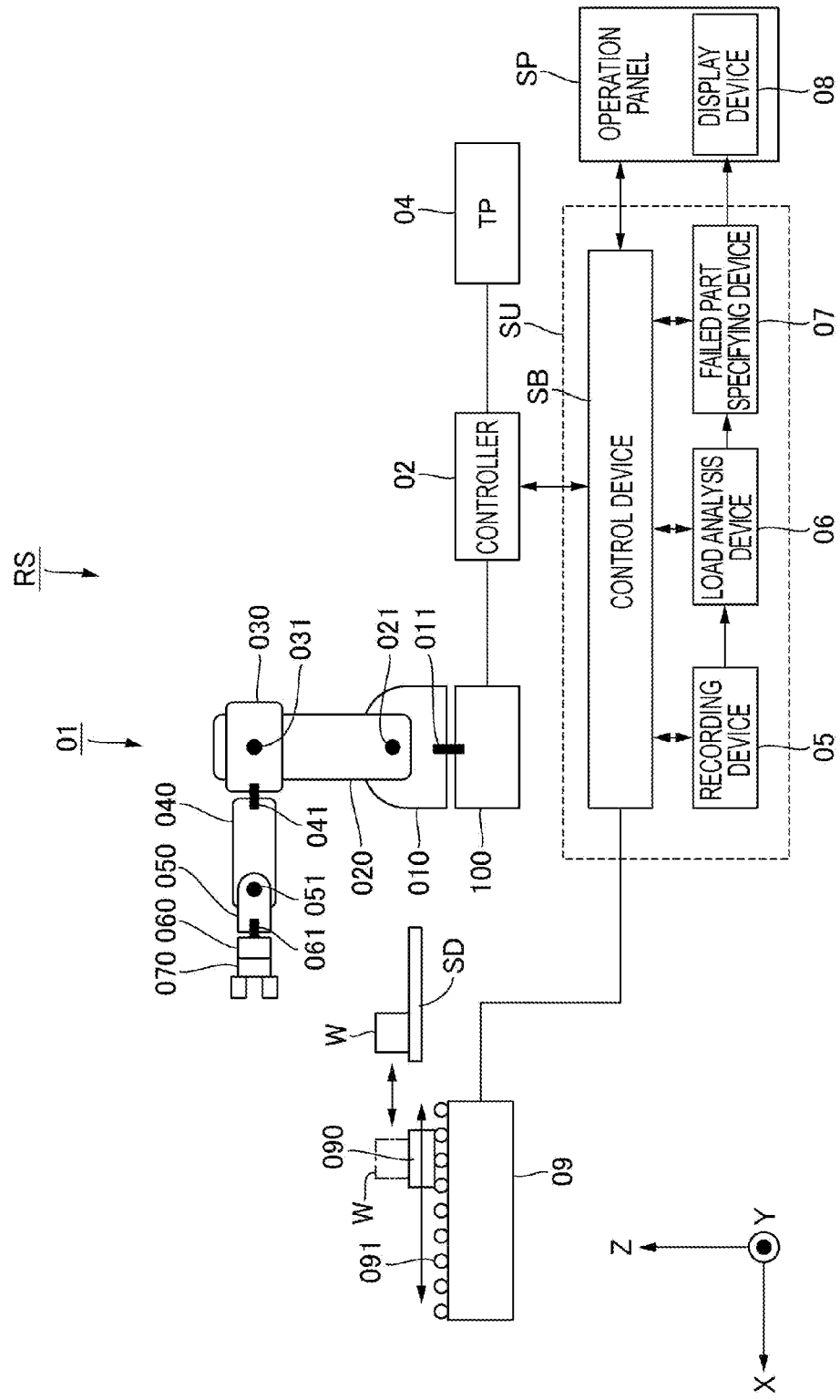
FIG. 1 is a diagram illustrating an overall configuration of a robot system according to a first embodiment.

FIG. 1 is a diagram illustrating an overall configuration of a robot system according to a first embodiment. As illustrated in FIG. 1, in a robot system RS of the first embodiment, when a robot 01 mounted on a production line collides with a device or the like existing around it, a control device SB specifies a failed part of the robot 01. The control device SB specifies which part of which joint of the robot 01 is broken, from the moving speed and the moving direction of each joint of the robot 01 immediately before the collision recorded on a recording device 05.

(Articulated Robot)

As illustrated in FIG. 1, the robot 01 takes an initial posture. The robot 01 is a six-axis articulated robot having an end effector 070 provided to a link 060 at the leading edge.

A base 100 and a link 010 of the robot 01 are connected with each other by a torsional joint 011 which rotates about the axis of rotation in a Z axis direction. The torsional joint 011 has a movable range of ±180 degrees from the initial posture. The torsional joint 011 is abbreviated as a J1 joint.

The link 010 and a link 020 of the robot 01 are connected with each other by a rotary joint 021 which rotates about the axis of rotation in a Y axis direction. The rotary joint 021 has a movable range of ±80 degrees from the initial posture. The rotary joint 021 is abbreviated as a J2 joint.

The link 020 and a link 030 of the robot 01 are connected with each other by a rotary joint 031 which rotates about the axis of rotation in the Y axis direction. The rotary joint 031 has a movable range of ±70 degrees from the initial posture. The rotary joint 031 is abbreviated as a J3 joint.

The link 030 and a link 040 of the robot 01 are connected with each other by a torsional joint 041 which rotates about the axis of rotation in an X axis direction. The torsional joint 041 has a movable range of ±180 degrees from the initial posture. The torsional joint 041 is abbreviated as a J4 joint.

The link 040 and a link 050 of the robot 01 are connected with each other by a rotary joint 051 which rotates about the axis of rotation in the Y axis direction. The rotary joint 051 has a movable range of ±120 degrees from the initial posture. The rotary joint 051 is abbreviated as a J5 joint.

The link 050 and a link 060 of the robot 01 are connected with each other by a torsional joint 061 which rotates about the axis of rotation in the X axis direction. The torsional joint 061 has a movable range of ±240 degrees from the initial posture. The torsional joint 061 is abbreviated as a J6 joint.

To the tip of the link 060 of the robot 01, the end effector 070 such as electric hands or air hands for performing assembling operation and moving operation in the production line is connected.

The robot 01 performs a given operation by being controlled by a controller 02. The controller 02 is a control computer equipped with a CPU which performs arithmetic processing, a ROM storing programs and data for operating the robot 01 and causing it to perform assembling of works, a RAM which provides a temporal storage in the arithmetic processing, and the like.

An operation panel SP includes a display device 08 which is an example of a display unit, and an operation switch. An operator is able to perform various types of instructive operations on the robot 01 through the operation panel SP, and set various operation modes.

A teaching pendant 04 is a remote control device for manually operating the robot 01 by a human. An operator operates the teaching pendant 04 to select a joint shaft that the operator desires to move, and designates the speed and the rotational direction of the joint with numeral values, to thereby be able to actually operate the robot 01. Further, it is also possible to select some types of continuous operation, prepared by a program beforehand, by the teaching pendant 04 and cause it to be performed.

A peripheral device 09 is a device which supports assembling work and conveying work performed by the robot 01. The peripheral device 09 has a mechanism in which a moving device 090 slides along a guide rail 091. The robot places a main body work W, which is conveyed by the moving device 090, onto a workbench SD so as to assemble a part, and returns the main body work W in which the part has been assembled to the workbench SD.

(Joint Structure)

Figure 2:
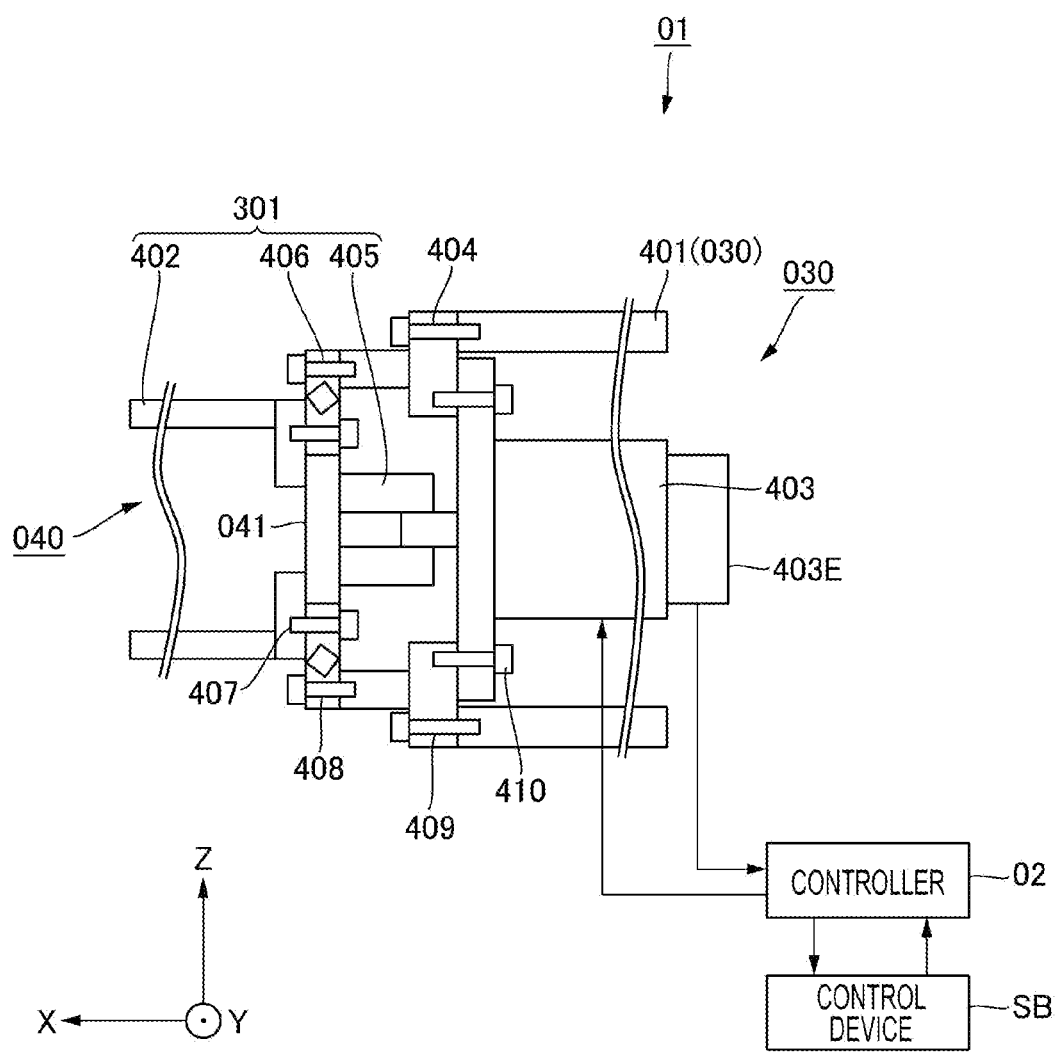
FIG. 2 is a diagram illustrating a structure of a joint of a robot.

FIG. 2 is a diagram illustrating a joint structure of the robot. Each of the torsional joints 011, 041, and 061 and the rotary joints 021, 031, and 051, illustrated in FIG. 1, has basically a common structure including a motor, an encoder, a bearing, and a reduction gear. As such, description will be given on the torsional joint 041, and overlapping description regarding other joints is omitted.

As illustrated in FIG. 2, a motor 403 is a motor for rotating the torsional joint 041.

A reduction gear 405 is a Harmonic Drive (registered trademark) reduction gear which reduces the speed of rotation of the motor 403 to rotate a frame 402 of the link 040.

A bearing 406 is a cross roller bearing which supports the link 040 in a torsionally rotatable manner about the X axis when the link 040 is positioned in the X-axis direction.

An encoder 403E is an incremental encoder which outputs pulses of the number proportional to the angle of rotation of the motor 403. The encoder 403E includes an origin matching sensor for performing origin matching between the link 030 and the link 040.

When electric power is supplied, the controller 02 performs origin matching between the link 030 and the link 040 by referring to an output of the encoder 403E. Then, by recognizing the speed of rotation and the angle of rotation of the motor 403 by the pulse count of output pulses of the encoder 403E, the controller 02 performs feedforward control on the torsion angles of the link 030 and the link 040.

As described above, the robot 01, which is an example of an articulated robot, is configured such that a plurality of links are connected via joints. The respective joints of the robot 01 include motors 403 which drive the joints respectively and encoders 403E which are exemplary detection devices and detect the rotational amounts of the joints respectively. The controller 02 controls the motor 403 based on the output of the encoder 403E.

Meanwhile, when the robot 01 interferes with another object, the frame structures of the links 010, 020, 030, 040, and 050 may be plastically deformed due to the load of the interference whereby the robot 01 may be deformed. However, it is difficult to repair or replace the frame structures of the links 010, 020, 030, 040, and 050, due to the structure of the robot 01. As such, the frame structures of the links 010, 020, 030, 040, and 050 are designed to have a larger safety factor than that of the reduction gear 405 and the bearing 406. Thereby, when the robot 01 interferes with another object, the reduction gear 405 or the bearing 406, in which repair and part replacement can be made easily, is allowed to be failed selectively.

(Occurrence of Abnormality)

In recent years, assembling of various products is carried out using a production line incorporating an articulated robot. In a product group such as cameras and printers, frequency of changes in a production line incorporating an articulated robot is high, due to a large number of models and a relatively short product cycle.

Recently, production of a variety of types in small quantities has been developing in various products as market needs. In order to cope with such production of a variety of types in small quantities, a production line incorporating an articulated robot needs to shorten the time required for a start in the case of rearranging the production line.

In the case of changing or rearranging a production line, when starting the production line, a trouble may occur in teaching which is an operation to teach the articulated robot a work.

As illustrated in FIG. 1, in order to use the robot 01 in a production line, a teaching operation to make the robot 01 learn the operating position and the work content is required. In the teaching operation, an operator operates the robot manually using the teaching pendant 04. At this time, the operator may cause the robot 01 to collide with the peripheral device 09 due to a human error. In the production line, as the robot 01 and the peripheral device 09 are installed in a small space in order to improve the space efficiency, collision between the robot 01 and the peripheral device 09 occurs easily even with a small operational error or a setting error.

Further, after completion of the teaching operation to teach the robot 01 an operation, a trouble may occur in the stage of operating the robot 01 and the peripheral device 09 in cooperation with each other. At this time, interference between the devices may be caused which did not occur when the robot 01 and the peripheral device 09 were operated individually.

When the robot 01 interferes with the peripheral device 09, another robot, or an object, a disorder may be caused due to an origin shift, plastic deformation, a part shift, or the like in any of the torsional joints 011, 041, and 061 and the rotary joints 021, 031, and 051 of the robot 01. If operation of the robot 01 is continued while leaving the disorder, a work assembling accuracy may be degraded.

As such, when the robot 01 interferes with an object or the like so that an emergency stop is caused, it is necessary to check presence or absence of a failure portion and to specify the failure portion. Conventional failure portion specifying methods include a method in which a brake of a joint of the robot 01 is released, and a serviceman manually moves the joint of the robot 01 to thereby check a sense of incongruity conducted to the hand when rotating it. Another method is that pin holes are provided in two links connected by a joint, and in order to check an origin shift of the joint, an origin pin is inserted in the pin holes to check whether or not there is an origin shift. These methods need skill, involve difficult works, and take a quite long time. As such, a method capable of easily specifying a failure portion in the robot 01 in a short time is required.

In view of the above, the first embodiment incorporates a program for automatically determining presence or absence of a failure in joint shafts of the robot 01 immediately, when interference of the robot 01 occurs. This program automatically predicts not only presence or absence of a failure in joint shafts of the robot 01 but also the part in which the failure occurred, and notifies the operator of it.

(Control Unit)

As illustrated in FIG. 1, the control device SB is a control computer equipped with a CPU which performs arithmetic processing, a ROM storing programs and data, a RAM which provides a temporal storage in the arithmetic processing, and the like. The control device SB controls the peripheral device 09 and the robot 01 in accordance with a given program to execute an operation of assembling the main body work W.

A control unit SU includes the control device SB, the recording device 05, a load analysis device 06, and a failed part specifying device 07, and is incorporated in the robot system RS. The control unit SU processes data obtained from the controller 02, the recording device 05, the load analysis device 06, and the failed part specifying device 07, determines presence or absence of a failure in the joint shafts of the robot 01, and specifies the failure portion. The control unit SU displays, on the display device 08, the determination result of presence or absence of a failure in the joint shafts of the robot 01 and the specification result of the failure portion.

As illustrated in FIG. 2, when the robot 01 interferes with another object, unexpected electric current flows in the motor 403. The amount of unexpected electric current differs depending on the place where the interference occurs, the moving speed at that time, the angle of rotation, and the states of other joints. At the same time, the encoder 403E detects unexpected deformation and impact deviating from the program, and outputs them.

When interference occurs during operation of the robot 01, the control unit SU detects abnormality in the operation of the robot 01, and performs a stopping step of the robot 01. Then, in a state where the robot 01 is stopped, the control unit SU allocates the arithmetic capacity to damage determination of the respective joints of the robot 01. The control unit SU collects, from the recording device 05, the electric current value of the motor 403 and the output value of the encoder 403E retrospectively from the time of occurrence of the interference, reproduces the state of interference in the virtual space on the operation, and evaluates presence or absence of damage in the torsional joint 041.

(Recording Device)

The control unit SU records operation data of the robot 01 and the peripheral device 09 during operation of the robot 01, on the recording device 05. The recording device 05 constantly records operation speeds, joint angels, and electric current values of the motors of the respective joints, obtained from the encoders of the torsional joints 011, 041, and 061, and the rotary joints 021, 031, and 051 of the robot 01 as time-series data per 10 msec. The speed and the moving position of the peripheral device 09, obtained from the data of the position sensor of the moving device 090, are also recorded. The control device SB constantly deletes data in which five seconds have elapsed from the acquisition in the recording device 05.

In the recording step, the recording device 05 continuously records movement information of each joint based on the output of the encoder 403E and the load information of each joint based on the output of the motor.

(Load Analysis Device)

The load analysis device 06 is a data processing computer equipped with a CPU which performs arithmetic processing, a ROM storing programs and data, a RAM which provides a temporal storage in the arithmetic processing, and the like. The load analysis device 06 performs dynamic computation of the robot 01 and the peripheral device 09, and when another object interferes with the robot 01, calculates the magnitude and the direction of the impact caused in the respective joints of the robot 01.

In the specifying step, the load analysis device specifies the magnitude and the direction of a force acted on the joints of the robot 01, based on the load information and the movement information recorded at least before an abnormality is detected until the abnormality is detected.

(Failed Part Specifying Device)

The failed part specifying device 07 is a data processing computer equipped with a CPU which performs arithmetic processing, a ROM storing allowable loads of the respective parts, a RAM which provides a temporal storage in the arithmetic processing, and the like. The failed part specifying device 07 specifies in which part of which portion of the robot 01 a failure occurred, from the magnitude and the direction of the impact calculated by the load analysis device 06, regarding the torsional joints 011, 041, and 061 and the rotary joints 021, 031, and 051 of the robot 01. The failed part specifying device 07 compares the allowable loads of the respective parts recorded on the ROM with the magnitude of the impact on the respective parts calculated by the load analysis device 06 to thereby determine a possibility of occurrence of a failure in the respective parts.

The failed part specifying device 07 specifies a damaged joint among the joints based on the magnitude and the direction of the force specified by the load analysis device 06, and further specifies the damaged part in the joint.

(Display Device)

The control unit SU performs an output step to output information specifying a damaged joint by operating the display device 08. The control unit SU displays, on the display device 08, a state of presence or absence of occurrence of a failure in a part specified by the failed part specifying device 07, and urges the operator to perform processing necessary for a return to the production process after the interference.

(Link Replacement Unit)

FIGS. 3A and 3B are diagrams illustrating replacement of a spare link unit. When a trouble such as collision occurs in the production line, it is required to restart the production line immediately. However, the configuration of the joint of the robot 01 is complicated as illustrated in FIG. 2 so that a huge time is also required for a repair work after specifying the failure portion. As such, there is a need for the robot 01 designed to have a configuration in which disassembling and assembling can be made easily.

As illustrated in FIG. 3A, when a trouble that the robot 01 failed occurs, the robot 01 can be removed from the production line and repaired in the repair area, and then the entire robot 01 can be set on the production line again. As the robot 01 is designed to be able to be disassembled and assembled with the joint shaft, the robot can be disassembled and assembled by taking the link unit 301 with the joint shaft in the repair area.

It is also possible to remove the failed link unit 301 with the joint shaft from the robot 01, and replace it with a spare link unit 303 having been prepared, as illustrated in FIG. 3B. In that case, repair can be made on the production line without removing the robot 01 from the production line.

As the robot 01 is designed such that the safety factor of the intensity of the link unit 301 at the leading edge is smaller than that of another link unit 302 on the root side, when the robot 01 interferes with an object around it, the link unit 301 at the leading edge having a small safety factor tends to be broken first. As the spare link unit 303 of the leading edge is prepared in the base 100 of the robot 01, by only taking the spare link unit 303 out of the base 100 and replacing it with the link unit 301 at the leading edge, repair of the robot 01 can be completed quickly. A section structure of the dotted-line portion A in FIG. 3A is illustrated in FIG. 2.

As illustrated in FIG. 2, the link 030 and the link 040 are structured to be disassembled easily at the torsional joint 041. The link unit 301 is disassembled between the link 040 and the link 030 whereby the portion of the leading edge side from the torsional joint 041 can be replaced easily. When the link unit 301 is disassembled, parts subjected to a failure such as the motor 403 and the reduction gear 405 for driving the torsional joint 041 are assembled to the link 040 in a set.

The torsional joint 041 includes the motor 403, the reduction gear 405, and a cross roller bearing 406. The motor 403 is fixed to a housing 404 with screws 410. The housing 404 is fixed to a frame 401 of the link 030 with screws 409.

The cross roller bearing 406 is a needle bearing rotatably supporting a rotation guiding mechanism which transmits rotation of the reduction gear 405 to the frame 402 of the link 040. The inner ring of the cross roller bearing 406 is fixed to the frame 402 of the link 040 with screws 407. The outer ring of the cross roller bearing 406 is fixed to the motor housing 404 with screws 408.

When the screws 409 are removed, the robot 01 is able to be disassembled such that the link unit 301 ahead of the link 040 is removed integrally with the torsional joint 041. As illustrated in FIG. 3B, by preparing the spare link unit 303, it is possible to replace the link 040 integrally with the torsional joint 041 only with the screws 409. As illustrated in FIG. 3A, as it is only necessary to replace the link unit 301 with the spare link unit 303 in the first embodiment, it is possible to complete the repair more quickly, compared with the case of performing repair on a part basis of the joint shaft of the robot 01.

As illustrated in FIG. 2, as the link unit 301 at the leading edge adopts a structure of easy repair, the time required for repair and restoration when a failure occurs in the robot 01 can be reduced. However, FIG. 2 illustrates an exemplary structure in which disassembling can be made easily at the torsional joint 041, and the present invention is not limited to the structure of FIG. 2.

(Control when Abnormality Occurs)

Figure 4:
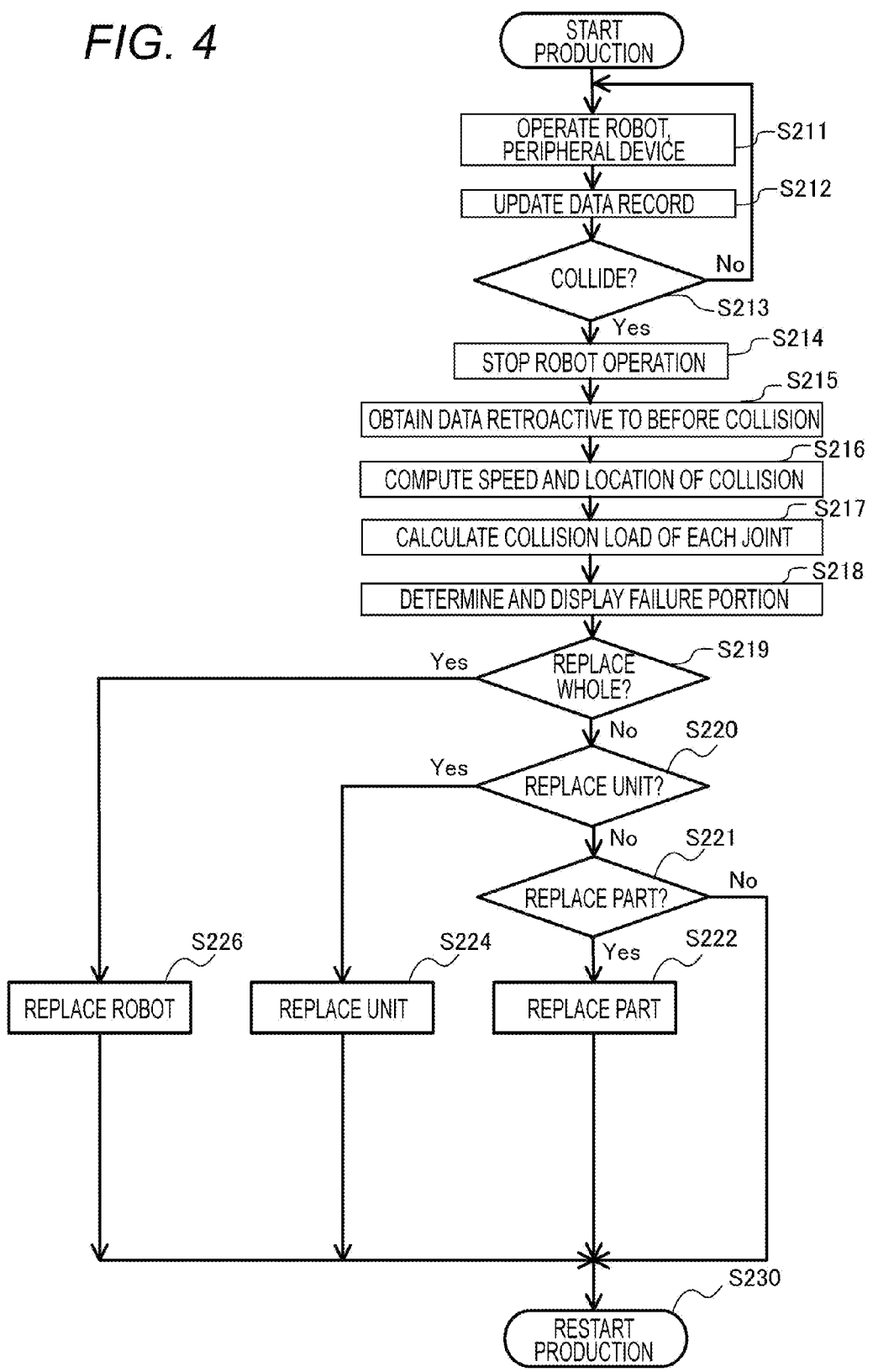
FIG. 4 is a flowchart illustrating failure portion display control.

FIG. 4 is a flowchart of failure portion display control. As illustrated in FIG. 4 with reference to FIG. 1, when a start of a production line is instructed (S211), the control device SB starts operation of the robot 01 and the peripheral device 09.

The control device SB records the operation information of the robot 01 every moment and the operation information of the peripheral device 09 every moment on the recording device 05 for a predetermined period of time, and updates them constantly (S212).

When a difference between the electric current value and the reference current of each motor and a difference between the output value and the reference position of each encoder exceeds a predetermined allowable range, the control device SB determines that the robot 01 interferes with another object. When collision of the robot 01 occurs (YES at S213), the control device SB stops operation of the robot 01 and the peripheral device 09 via the controller 02 (S214). After the determination to stop, the control device SB records the operation information of the robot 01 every moment and the operation information of the peripheral device 09 every moment in the recording device 05 until the robot 01 actually stops.

After the robot 01 stopped, the load analysis device 06 obtains, from the recording device 05, time-series data of the electric current values of all motors and time-series data of the output values of all encoders in a period before the collision until the stop through the collision (S215).

After the robot 01 stopped, the load analysis device 06 specifies the collided position between the robot 01 and the other object and the moving speed of each joint at the time of collision, using the time-series data of the electric current values of the motors and the time-series data of the output values of the encoders (S216).

The load analysis device 06 simulates the operation of the robot 01 from the collision to the stop, and obtains a collision load of each joint, using the collided position between the robot 01 and the other object and the moving speed of each joint at the time of collision (S217). The load analysis device 06 calculates the posture, the moving direction, and the moving speed of each link of the robot 01 at the time when the collision occurred, from the operation data of the robot 01 and the peripheral device 09 before the collision stored in the recording device 05. The load analysis device 06 calculates the direction and the magnitude of the impact on each joint of the robot 01, from the operation data of the robot 01 and the peripheral device 09 from the occurrence of the collision to the stop. The load analysis device 06 obtains an impact load curve for each joint from the collision to the stop, and outputs a curve representing variance in time of the impact load of each joint to the display device 08.

The failed part specifying device 07 compares the impact load curve with the allowable load for each joint, determines presence or absence of a failure portion (joint) of the robot, and if there is a failure portion (joint) of the robot, displays the portion (joint) and the failed part name on the display device 08 (S218). The load analysis device 06 determines whether or not a failure occurred in each joint of the robot 01 by the load calculated from the time-series data of the output values of the encoders and the time-series data of the electric current values of the motors (Yes at S219, Yes at S220, and Yes at S221).

The failed part specifying device 07 specifies a failure portion of the robot 01. The failed part specifying device 07 displays the failed joint number calculated, and the failed part name in the joint, on the display device 08 (S226, S224, and S222). The failed part specifying device 07 specifies a joint having a high possibility of failure, and determines measures against the failure and displays it on the display device 08 (S226, S224, and S222). Then, when the measures are taken against the failure by the serviceman, the production line is restarted (S230).

In the control method described above, when collision of the robot 01 occurs (Yes at S213), the control device SB stops operation of the robot 01 and the peripheral device 09 via the controller 02 (S214). However, in the robot stopping step (S214), it is possible to determine presence or absence of a failure in the robot (S218) and stop it if there is a failure.

(Measures when Abnormality Occurs)

When the failed part specifying device 07 determines that there are two or more failure portions in the robot 01, it determines to replace the entire robot 01. If there are many failure portions and it takes time for repair or it is unrepairable, the failed part specifying device 07 determines to replace the entire robot 01 (Yes at S219).

In accordance with the display of the operation panel SP, the serviceman removes the robot 01 from the production line, installs a new robot 01 which is kept as a spare on the production line, and inputs completion of replacement to the operation panel provided to the display device 08 (S226).

When replacement of the entire robot 01 is completed, the control device SB restarts the production step (S227). However, as enormous costs are required to prepare and keep a spare robot 01, replacing the entire robot 01 is not a preferable method.

If there is one failure portion in the robot 01, the failed part specifying device 07 specifies the failure portion of the robot 01 and determines to allow part replacement or repair to be performed. In the case of the robot 01 or the peripheral device 09 designed to be configured of units, if repair is going to be completed by removing and installing a unit, the failed part specifying device 07 determines to replace a unit (Yes at S220).

If any of mechanical parts constituting a joint of the robot 01 failed, the failed part specifying device 07 determines to allow part replacement (Yes at S221). If there is no failure portion, the failed part specifying device 07 determines to keep the current state (No at S221), and restarts the production line (S230).

As described above, the robot system RS includes at least one replaceable unit in which one link and one joint coupled to the link are integrally assembled as a replacement unit.

(Failure Portion Determination Control)

Figure 5:
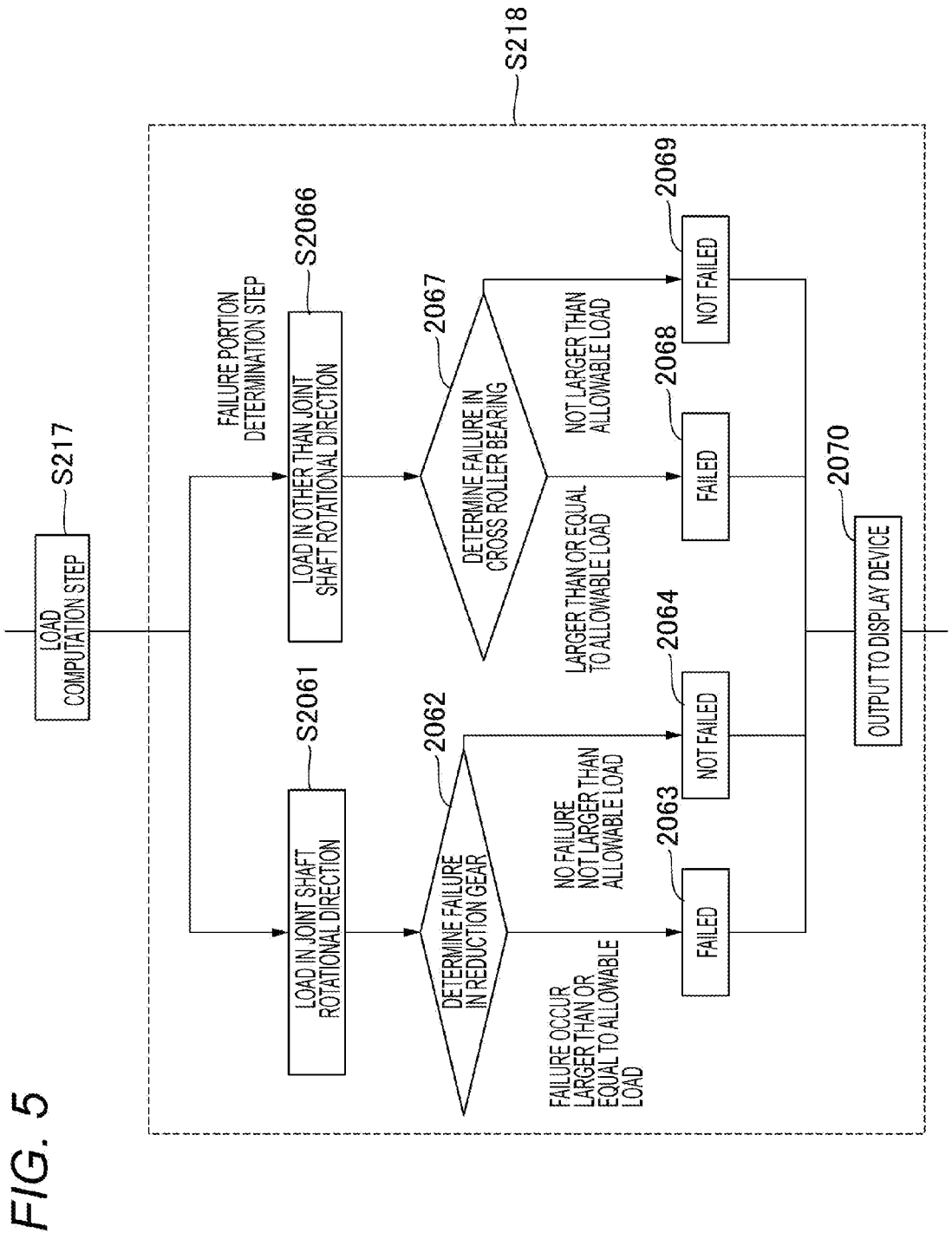
FIG. 5 is a flowchart illustrating failure portion determination control.

FIG. 5 is a flowchart of failure portion determination control. As illustrated in FIG. 5 with reference to FIG. 1, the load analysis device 06 calculates an impact placed on each of the torsional joints 011, 041, and 061 and the rotary joints 021, 031, and 051, when interference of the robot 01 occurs (S217). The load analysis device 06 calculates the operation of the robot 01 and the peripheral device 09 and propagation of the impact through simulation, using the time-series data of the operation of the robot 01 from the time before the robot 01 interferes with another object until the time when interference occurs and the robot 01 stops, recorded on the recording device 05.

Based on the simulation result of propagation of the impact obtained by the load analysis device 06, the failed part specifying device 07 calculates the magnitude and the direction of the load generated in each of the torsional joints 011, 041, and 061 and the rotary joints 021, 031 and 051 of the robot 01 (S217).

Meanwhile, even if the load placed on the joint is the same, a part to be damaged in the joint differs depending on the deviation in the rotational direction of the joint and the direction of the load. As such, when interference with another object occurs, a part which may be broken in the joint differs if the direction of the joint shaft differs. In the case where the robot 01 interferes with another object in the posture illustrated in FIG. 1, the moment of Y axis rotation acted on the rotary joints 021, 031, and 051 may damage the reduction gear of the joint shaft, and a load in a direction other than that may damage the bearing of the joint shaft. The moment of X axis rotation acted on the torsional joints 041 and 061 may damage the reduction gear of the joint shaft, and a load in a direction other than that may damage the bearing of the joint shaft.

For example, as illustrated in FIG. 2, if the link 040 is positioned in an X axis direction, the rotational direction of the joint shaft of the torsional joint 041 rotates about the X axis. Then, the moment of X axis rotation acted on the torsional joint 041 due to interference with another object may damage the reduction gear 405 constituting the joint shaft. A load in a direction other than that may damage the bearing 406.

As such, the failed part specifying device 07 calculates the moment in the rotational direction of the torsional joint 041 generated in the torsional joint 041 due to interference with another object (S2061). The failed part specifying device 07 compares a peak value of the calculated moment in the rotational direction of the torsional joint 041 with an instantaneous allowable maximum torque of the reduction gear 405, and performs failure determination of the reduction gear 405 (S2062). If the peak value of the moment generated by collision is larger than the instantaneous allowable maximum torque of the reduction gear 405, it is determined that a failure occurred in the reduction gear 405 (S2063). If the peak value of the moment generated by collision is not larger than the instantaneous allowable maximum torque of the reduction gear 405, it is determined that failure did not occur in the reduction gear 405 (S2064).

The failed part specifying device 07 calculates a load in a direction other than the rotational direction of the torsional joint 041 generated in the torsional joint 041 due to interference with another object (S2066). Then, the failed part specifying device 07 compares a peak value of the load in a direction other than the rotational direction of the torsional joint 041 with the static allowable load of the bearing 406 in order to determine presence or absence of a failure of the bearing 406 (S2067). If the peak value of the load is larger than the static allowable load of the bearing 406, it is determined that the bearing 406 failed (S2068), while if the peak value of the load is not larger than the static allowable load of the bearing 406, it is determined that the bearing 406 did not fail (S2069).

The failed part specifying device 07 performs similar load calculation and failure determination on each of the torsional joints 011, 041, and 061 and the rotary joints 021, 031, and 051, of the robot 01, individually (S2061 to S2069). The failed part specifying device 07 determines in which part of which joint shaft of the robot 01 a failure occurred due to the interference with another object, and displays it on the display device 08 (S2070).

As described above, the reduction gear 405, which is an example of a change gear, decelerates the rotation of the motor 403 and drives each joint individually. The bearing 406, which is an example of a bearing, rotatably supports the link 040, which is an example of a member driven by the reduction gear 405, individually. The failed part specifying device 07 specifies which of the reduction gear 405 and the bearing 406 is damaged in the joint determined to be damaged.

(Display Output)

Figure 6B:
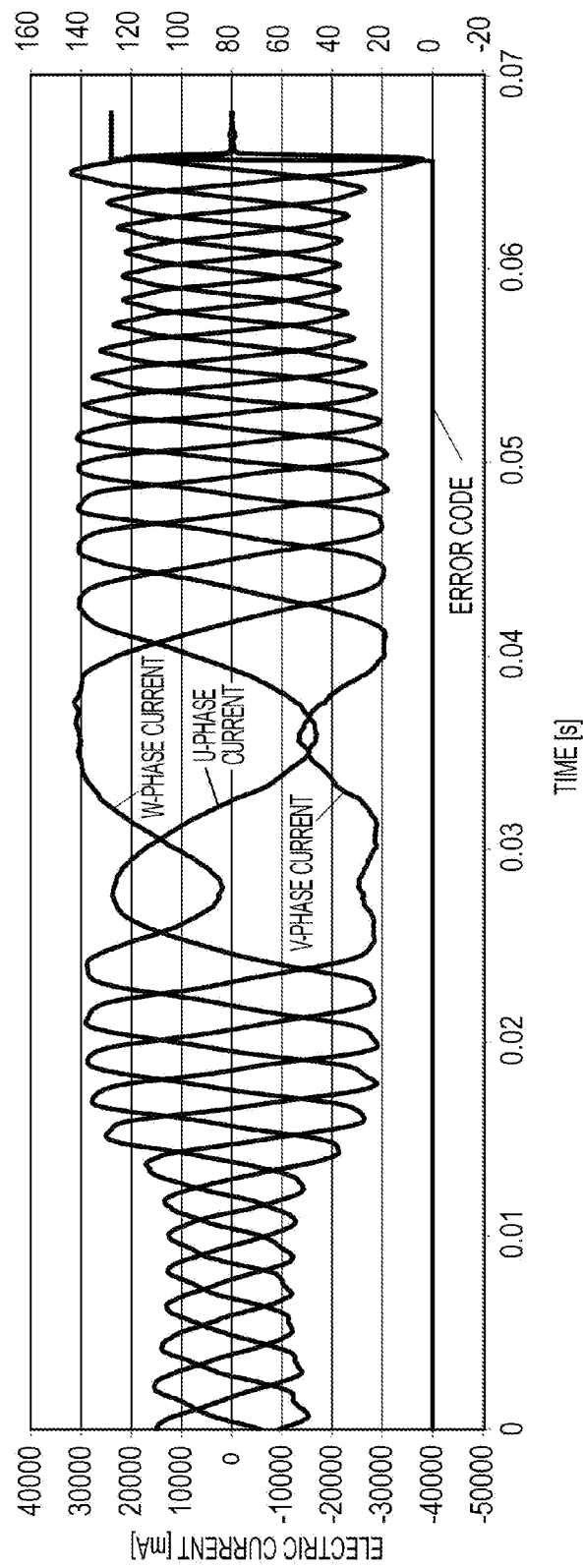

FIGS. 6A and 6B are diagrams illustrating detection information when the robot interferes with another object. FIG. 7 is a diagram illustrating a load display of each of the joints when the robot interferes with another object.

FIGS. 6A and 6B illustrate changes in the encoder output and the motor electric current in the torsional joint 061 when the end effector 070 of the robot 01, illustrated in FIG. 1, interferes with another adjacent robot. Interference occurs, and the reduction gear of the torsional joint 061 is broken and deviation is caused in the encoder. When a difference between the output value (current position) of the encoder and the instructed position exceeds a threshold, the control device SB outputs an error code to the controller 02 and stops the robot 01 urgently.

After the occurrence of interference, the motor (AC servo motor) installed in the torsional joint 061 of the robot 01 attempts to match the current position of the encoder to the instructed position whereby the electric current increases, and then step-out is caused and the waveform is disturbed. The recording device 05 records everything about it.

The load analysis device 06 analyzes the record data, recorded by the recording device 05, of the encoder output and the motor electric current of each of the rotary joints 021, 031, and 051 and the torsional joints 011, 041, and 061 to thereby obtain a load curve representing variance in time of the load generated in each joint along with the interference. Based on the obtained load curve, the failed part specifying device 07 obtains maximum loads generated in the reduction gear and the bearing of each joint along with the interference, and determines that the reduction gear or the bearing is broken if they exceed the allowable loads of the reduction gear and the bearing.

As illustrated in FIG. 7, the display device 08 of the operation panel SP displays, in a list, the analysis results of the maximum loads performed by the failed part specifying device 07. On the display device 08, the rotary joints 021, 031, and 051 and the torsional joints 011, 041, and 061 are written as J1 joint to J6 joint, as described above. The allowable load b of the bearings and the allowable load g of the reduction gears are displayed, and the evaluation results of the broken conditions of the bearings and the reduction gears in the J1 joint to the J6 joint are displayed visually.

Comparative Example 1

In Japanese Patent Application Laid-Open No. 11-202914, a motor electric current when a robot is caused to perform a given operation is compared with a previous state or with a predetermined value to thereby specify a failed joint. However, this method involves three problems.

The first problem is that while it is possible to determine a failed joint of a robot, it is impossible to determine a failed part of the joint. Mechanical elements provided to a joint of a robot include a motor, a reduction gear, a bearing, a frame structure, and the like. In order to repair the robot quickly, it is not sufficient to merely determine which joint failed, but it is necessary to determine which part in the joint failed. From this viewpoint, the method of Japanese Patent Application Laid-Open No. 11-202914 is not able to specify a failed part constituting a joint.

The second problem is that as an electric current in a motor differs depending on the operating speed even if the robot is caused to perform the same operation, in the case of interference which occurred when the operating speed is other than the predetermined speed, there is a problem that even a failed joint cannot be specified.

For example, in the case of comparing a peak current flowing in a motor with a reference current value obtained experimentally, if interference occurs at a speed set for the first time, there is no data of a reference current value obtained experimentally to be compared. As such, a failed joint cannot be specified. In general, teaching operation of a robot when starting a production line begins at a slow speed, and the speed is gradually increased while checking no problem is caused. As such, the operation speed varies. As most interference troubles of a robot occur during the teaching operation, if it is impossible to calculate a load at a speed set for the first time, it is insufficient as failure diagnosis of a robot.

The third problem is that when a robot remains stationary, if a peripheral device or another robot moves and makes collision, the electric current flowing in the motor of the stationary robot is only in a level of holding the posture of the robot, so that the load at the collision cannot be obtained accurately. If the load cannot be obtained accurately, the determination accuracy of whether or not a failure occurs is also degraded.

In contrast, in the first embodiment, when a robot interferes with another object, the rotational position and the rotational speed of each joint of the robot before collision are stored as time-series data. As such, it is possible to accurately calculate the magnitude and the direction of a load acted on each joint at the time of collision. From the allowable load and the load at the time of collision of each mechanical element in every joint of the robot, it is possible to presume presence or absence of damage in each mechanical element accurately. When the robot interferes with another object at unintentional timing, it is possible to urgently stop the robot so as to prevent occurrence of further damage, and to specify the failure portion and the failed part of the robot quite accurately in the stopped state.

Effects of First Embodiment

According to the first embodiment, when a trouble that a robot interferes with another object occurs, it is possible to estimate load generation states in a large number of joints of the robot from the operation of the entire production line before the interference, regardless of the operating state of the robot. As such, it is possible to specify the failed joint and the failed part based on the load and the moment estimated accurately.

According to the first embodiment, in a production line using a robot, when the robot interferes with another object and is stopped urgently, it is possible to specify presence or absence of a failure in the robot, a failure portion, and a failed part. Thereby, it is possible to rapidly determine restart of the production line and replacement or repair of the robot.

According to the first embodiment, by using a robot designed to have a structure in which disassembling and assembling can be made by a joint shaft on a production line, it is possible to perform repair work quickly, and to restart the production line rapidly. As the robot is designed to be able to be assembled and disassembled easily, the time required from specifying of a failure portion until completion of repair can be shortened.

According to the first embodiment, it is possible to accurately determine a load state of each joint of an articulated robot. It is also possible to accurately estimate a load acted on each joint from the time when the articulated robot is determined to be stopped until the articulated robot is stopped actually.

According to the first embodiment, when an articulated robot interferes with another object, the robot is stopped urgently and broken conditions of the parts of each joint are evaluated while keeping the stopped state. As such, there is no need to operate the articulated robot having a broken part, for evaluation. There is no need to worry about further damage which may be caused by operating the articulated robot having a broken part.

According to the first embodiment, a damaged joint among a plurality of joints is specified based on movement information recorded from the time before detecting an abnormality until the robot 01 is actually stopped. As such, an impact acted from the time when a stop instruction is output until the robot 01 is actually stopped is never missed.

According to the first embodiment, during operation of the robot 01, movement information for a predetermined period of time is stored and movement information exceeding the predetermined period of time is deleted continuously. As such, even though the storage capacity of the recording device 05 is small, accurate data having a high density can be collected. As the data is limited, the arithmetic processing capability of the load calculation can also be saved. As the load calculation is performed while stopping the robot 01, it does not place a load on the robot system RS.

Second Embodiment

Figure 8:
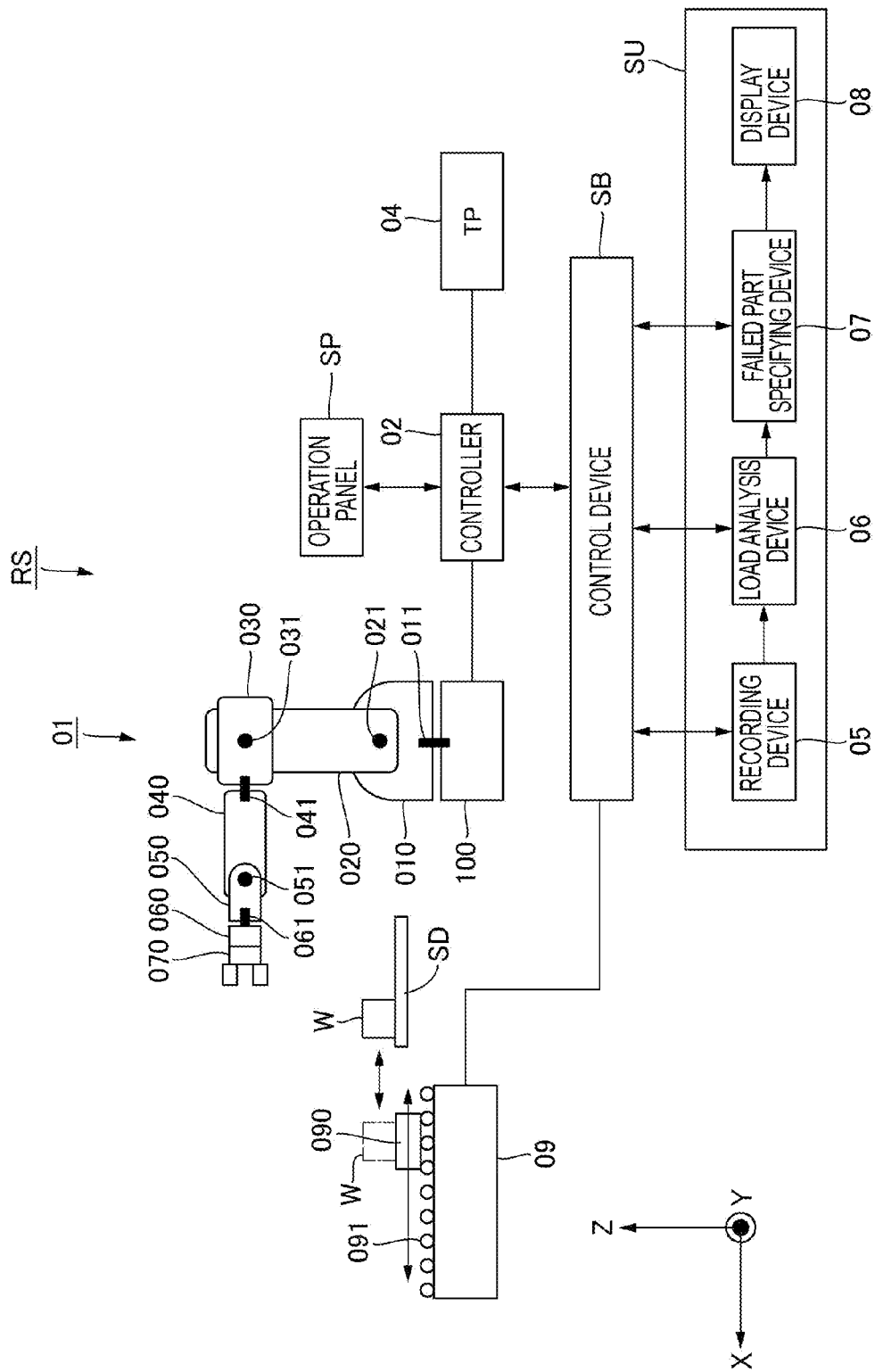
FIG. 8 is a diagram illustrating a configuration of a robot system according to a second embodiment.

FIG. 8 is a diagram illustrating a configuration of a robot system according to a second embodiment. As illustrated in FIG. 1, in the first embodiment, constituent elements (05, 06, and 07) for performing failure diagnosis for the robot 01 are incorporated in the control unit of the robot system RS. On the other hand, in the second embodiment, the failure diagnosis apparatus (05, 06, and 07) of the robot 01 is provided outside the control device SB of the robot system RS, as illustrated in FIG. 8. The constituent elements other than these and control of the second embodiment are the same as those of the first embodiment. As such, in FIG. 8, the same constituent elements as those of the first embodiment are denoted by the same reference signs as FIG. 1 and overlapping description is omitted.

As illustrated in FIG. 8, the control unit SU which is an example of a diagnosis apparatus is capable of being connected with the robot system RS, and continuously receives load information and movement information during operation of the robot 01 from the controller 02. The control unit SU continuously records movement information of each joint based on the output of the encoder 403E and load information of each joint based on the output of the motor 403, and determines abnormality based on at least one of the load information and the movement information to thereby stop the robot 01.

In a state where the robot 01 is stopped, the control unit SU specifies a damaged joint among a plurality of joints, and further specifies a damaged part in such a joint, based on at least the load information and the movement information acquired from the time before abnormality is detected until the time when the abnormality is detected. The control unit SU outputs information of an image and text specifying the damaged joint and the damaged part via the display device 08.

Other Embodiments

It should be noted that while in the first embodiment the instantaneous allowable maximum torque of the reduction gear 405 and the static allowable load of the bearing 406 are used as a basis for determining an occurrence of a failure, these numerical values may be replaced with experimental values or experience values.

The present embodiment can be implemented as a program for causing a computer to perform a method of controlling a robot system, or as a recording medium storing a program.

Further, in the first embodiment, description has been given on a method of specifying a joint shaft having a damaged part, among three joint shafts which rotate about a Y axis in a six-axis articulated robot. However, the present invention is not limited to a robot having this configuration. Even in a robot of another configuration, the present invention is able to specify a joint shaft having a damaged part by using the same method.

According to the method of controlling robot system of the present invention, as movement information of each joint is recorded, it is possible to obtain chronological changes in the load state of each joint at the time when an abnormality occurs, even after the abnormality is detected by using the movement information before detection of the abnormality. Accordingly, compared with the case where movement information before detection of an abnormality cannot be used, it is possible to accurately estimate the load state of each joint and to evaluate a possibility of damage with less error.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-102450, filed May 16, 2014, which is hereby incorporated by reference herein in its entirety.

What is claimed is:

1. A robot system controlling method, the robot system including an articulated robot and a control device, the articulated robot including a plurality of links connected by joints; a plurality of motors configured to drive the respective joints respectively; and a plurality of encoders configured to output values based on rotational angles of the respective motors respectively, the control device controlling the motors, the method comprising:
    a recording step of recording pieces of movement information of the respective joints based on electric current values of the respective motors and outputs of the respective encoders, by the control device; and
    a calculating step of calculating, if at least one of the electric current values of the respective motors exceeds a threshold value, magnitudes and directions of force acted on the respective joints based on the recorded pieces of movement information, by the control device.

2. The robot system controlling method according to claim 1, further comprising
    a step of stopping the articulated robot, if at least one of the electric current values of the respective motors exceeds a threshold value.

3. The robot system controlling method according to claim 1, further comprising:
    a specifying step of specifying a failure portion of the articulated robot based on the calculated magnitudes and the calculated directions of force acted on the respective joints; and
    an output step of outputting information of the failure portion of the articulated robot specified in the specifying step, by the control device.

4. A robot system controlling method, the robot system including an articulated robot and a control device, the articulated robot including a plurality of links connected by joints; a plurality of motors configured to drive the respective joints respectively; and a plurality of encoders configured to output values based on rotational angles of the respective motors respectively, the control device controlling the motors, the method comprising:
    a recording step of recording pieces of load information of the respective joints based on outputs of the respective motors and pieces of movement information of the respective joints based on outputs of the respective encoders, by the control device;
    a step of determining presence or absence of a failure in the articulated robot, when detecting an abnormality in an operation of the articulated robot, by the control device, based on the load information and the movement information recorded in at least a period from before detection of the abnormality until detection of the abnormality; and
    a specifying step of specifying a failure portion of the articulated robot if it is determined that there is a failure in the articulated robot in the step of determining.

5. The robot system controlling method according to claim 4, wherein
    the specifying step includes specifying a damaged joint among the joints based on the load information and the movement information recorded in a period from before detection of the abnormality until stop of the articulated robot.

6. The robot system controlling method according to claim 4, further comprising
    a step of stopping the articulated robot before the step of determining, when detecting the abnormality in the operation of the articulated robot, by the control device.

7. The robot system controlling method according to claim 4, further comprising
    a step of stopping the articulated robot by the control device, if it is determined that there is a failure in the articulated robot in the step of determining.

8. The robot system controlling method according to claim 4, wherein
the recording step includes holding the load information and the movement information of a predetermined period of time and erasing part of the movement information exceeding the predetermined period of time, during the operation of the articulated robot.

9. The robot system controlling method according to claim 4, wherein
each of the joints includes a change gear configured to decelerate rotation of the motor to thereby drive each of the joints respectively, and a bearing configured to rotatably support each member driven by the change gear respectively, and
the specifying step includes specifying which of the change gear and the bearing in the specified joint is damaged.

10. The robot system controlling method according to claim 4, further comprising
an output step of outputting information of the failure portion of the articulated robot specified in the specifying step, by the control device.

11. The robot system controlling method according to claim 10, further comprising a display unit configured to display an output of the control device, wherein
the output step includes obtaining a maximum load generated in each of the joints along with the abnormality and displaying the maximum load on the display unit.

12. The robot system controlling method according to claim 10, wherein
the output step includes obtaining a load curve representing variance in time of a load generated in each of the joints along with the abnormality, and displaying the load curve on the display unit.

13. A robot system comprising an articulated robot and a control device, wherein
the articulated robot includes:
a plurality of links connected by joints;
a plurality of motors configured to drive the respective joints respectively; and
a plurality of encoders configured to output values based on rotational angles of the respective motors respectively, and
the control device is configured to record pieces of load information of the respective joints based on electric current values of the respective motors and pieces of movement information of the respective joints based on outputs of the respective encodes, and to calculate, if at least one of the electric current values of the respective motors exceeds a threshold value, magnitudes and directions of force acted on the respective joints based on the recorded pieces of movement information.

14. The robot system according to claim 13, further comprising
at least one replaceable unit in which a link and a joint connected with the link are integrally formed as a replacement unit.

15. A diagnosis apparatus connected to a robot system including an articulated robot and a control device, the articulated robot including a plurality of links connected by joints; a plurality of motors configured to drive the respective joints respectively; and a plurality of encoders configured to output values based on rotational angles of the respective motors respectively, the control device configured to detect an abnormality in an operation of the articulated robot and stop the articulated robot, wherein
the diagnosis apparatus is configured to record load information and movement information which are input continuously from the robot system during the operation of the articulated robot, and when detecting an abnormality in the operation of the articulated robot, determine presence or absence of a failure in the articulated robot based on the movement information recorded in at least a period from before detection of the abnormality until detection of the abnormality, and if determining that there is a failure in the articulated robot, specify a failure portion of the articulated robot.

* * * * *